(12) United States Patent
Langer et al.

(10) Patent No.: US 7,213,724 B1
(45) Date of Patent: May 8, 2007

(54) TABLE TENNIS BALL DELIVERY DEVICE

(76) Inventors: David S. Langer, 59-012 Holawa Pl., Haleiwa, HI (US) 96712; John Stump, 409 S. Milpas St., Santa Barbara, CA (US) 93103

(*) Notice: Subject to any disclaimer, the term of this patent is extended or adjusted under 35 U.S.C. 154(b) by 0 days.

(21) Appl. No.: 10/361,995

(22) Filed: Jan. 15, 2003

(51) Int. Cl.
- *B65G 59/00* (2006.01)
- *B65H 3/30* (2006.01)
- *B65H 5/00* (2006.01)
- *B65H 3/00* (2006.01)
- *G07F 11/16* (2006.01)

(52) U.S. Cl. ............ 221/289; 221/294; 221/298; 221/236; 221/258; 221/271; 221/276

(58) Field of Classification Search .......... 221/289, 221/294, 298, 236, 258, 271, 276; 273/405
See application file for complete search history.

(56) References Cited

U.S. PATENT DOCUMENTS

| | | | | |
|---|---|---|---|---|
| 1,777,976 A | * | 10/1930 | Lacoste | 124/16 |
| 1,824,504 A | * | 9/1931 | Russell | 124/27 |
| 1,927,424 A | * | 9/1933 | Trubenbach et al. | 124/26 |
| 2,437,727 A | * | 3/1948 | Drumheller | 124/27 |
| 2,520,246 A | * | 8/1950 | Kasakevitch et al. | 124/26 |
| 2,783,754 A | * | 3/1957 | Harvey | 124/82 |
| 3,441,279 A | * | 4/1969 | Heppner et al. | 273/121 A |
| 3,565,433 A | * | 2/1971 | Breslow | 473/515 |
| 3,664,670 A | * | 5/1972 | Glass | 273/405 |
| 3,807,379 A | * | 4/1974 | Vodinh | 124/26 |
| 3,878,827 A | * | 4/1975 | Newgarden, Jr. | 124/81 |
| 4,002,336 A | * | 1/1977 | Beaver et al. | 473/431 |
| 4,091,791 A | * | 5/1978 | Castelli et al. | 124/73 |
| 4,241,716 A | * | 12/1980 | Tsui | 124/27 |
| 4,254,755 A | * | 3/1981 | Morgan et al. | 124/16 |
| 4,299,345 A | * | 11/1981 | Lanzl | 224/666 |
| 4,610,373 A | * | 9/1986 | Sherbondy | 221/155 |
| 4,721,091 A | * | 1/1988 | Ridley et al. | 124/26 |
| 4,765,618 A | * | 8/1988 | Daley | 473/431 |
| 4,844,458 A | * | 7/1989 | Gatchel et al. | 473/436 |
| 5,181,501 A | * | 1/1993 | Lien | 124/10 |

(Continued)

FOREIGN PATENT DOCUMENTS

JP 9-220329 A * 9/1997

*Primary Examiner*—Patrick Mackey
*Assistant Examiner*—Michael E. Butler
(74) *Attorney, Agent, or Firm*—Holland & Knight LLP; Richard E. Lyon, Jr.

(57) ABSTRACT

A table tennis ball delivery device adapted to be secured to or adjacent the side of a table tennis table for directing a ball to a player upon the activation of a switch by the player. The device includes a chamber for carrying a supply of table tennis balls, a ball transfer mechanism for selectively advancing an individual ball from the chamber to a location over a flexed or cocked delivery spring oriented such that upon activation of the switch by a player, the spring is released so as to strike a ball and launch the ball to the player. The ball transfer mechanism is coordinated with the spring cocking and release mechanism so as to position another ball over the delivery spring and re-cock the spring immediately upon the launching of the ball to the player.

44 Claims, 6 Drawing Sheets

U.S. PATENT DOCUMENTS

| | | | | |
|---|---|---|---|---|
| 5,207,421 A | * | 5/1993 | Gorvin | 124/79 |
| 5,368,172 A | * | 11/1994 | Barringer | 211/85.7 |
| 5,415,150 A | * | 5/1995 | Dallas | 124/50 |
| 5,472,189 A | * | 12/1995 | Pfeiffer et al. | 221/155 |
| 5,544,077 A | * | 8/1996 | Hershey | 702/58 |
| 5,613,678 A | * | 3/1997 | McKee et al. | 473/397 |
| 5,619,977 A | * | 4/1997 | Gatin | 124/7 |
| 5,639,133 A | * | 6/1997 | Mote | 294/19.2 |
| 5,800,288 A | * | 9/1998 | Mims | 473/417 |
| 5,820,499 A | * | 10/1998 | Thomas et al. | 473/496 |
| 5,839,607 A | * | 11/1998 | Swanson | 221/231 |
| 5,975,527 A | * | 11/1999 | Winchester | 273/129 V |
| 6,050,625 A | * | 4/2000 | Nisbet | 294/19.2 |
| 6,099,417 A | * | 8/2000 | Brown et al. | 473/417 |
| 6,109,252 A | * | 8/2000 | Stevens | 124/51.1 |
| 6,406,386 B1 | * | 6/2002 | Brazzell | 473/431 |
| 6,443,859 B1 | * | 9/2002 | Markin | 473/451 |
| 6,691,691 B1 | * | 2/2004 | Beynon et al. | 124/16 |
| 6,695,723 B2 | * | 2/2004 | Leal et al. | 473/417 |
| 6,755,072 B1 | * | 6/2004 | Kanemitsu et al. | 73/11.01 |
| 6,837,495 B2 | * | 1/2005 | Gerson et al. | 273/372 |
| 6,875,136 B2 | * | 4/2005 | Leal et al. | 473/451 |
| 2004/0094565 A1 | * | 5/2004 | Bosanac | 221/247 |

* cited by examiner

US 7,213,724 B1

TABLE TENNIS BALL DELIVERY DEVICE

BACKGROUND OF THE INVENTION

The present invention relates to a device for delivering table tennis balls to a player for use in practicing and playing the game of table tennis. In playing and practicing the game of table tennis, considerable time is spent in retrieving errant balls. The game would be more enjoyable if a device were available that, upon command, could deliver a fresh ball to the player. Such a device would also substantially increase the efficiency of time spent practicing the game in that the need to continually retrieve balls would be eliminated or substantially reduced. Such a device should be economical to produce, easy to use and readily installed. The present invention provides such a ball delivery device.

SUMMARY OF THE INVENTION

Briefly, the present invention is directed to a table tennis ball delivery device adapted to be secured to the side of the table tennis table for directing a ball to a player upon the activation of a switch by the player desiring the ball. The device comprises a reservoir of balls that selectively advances an individual ball to a delivery spring oriented such that upon activation of the switch, preferably mounted on the side of the table, the spring will strike the ball and direct the ball to the player. Two such ball delivery devices are typically employed on a given table, one such device being secured to a side of the table on each side of the net. Upon activation of the switch and the delivery of the ball by the spring, a ball feeding mechanism rapidly positions a fresh ball for delivery by the spring upon the subsequent activation of the switch. Through such a device, a ball can be kept almost continuously in play to enhance the enjoyment and aerobic benefits of the game while significantly improving the efficiency of practice time by effectively eliminating the need to continuously retrieve errant balls.

It is therefore the principal object of the present invention to provide a table tennis ball delivery device that upon activation quickly and conveniently delivers a fresh ball to a player so as to minimize interruption of play and practice.

This and other objects and advantages of the present invention will become readily apparent from the following detailed description taken in conjunction with the accompanying drawings.

DETAILED DESCRIPTION OF THE PREFERRED EMBODIMENTS

Figure 1:
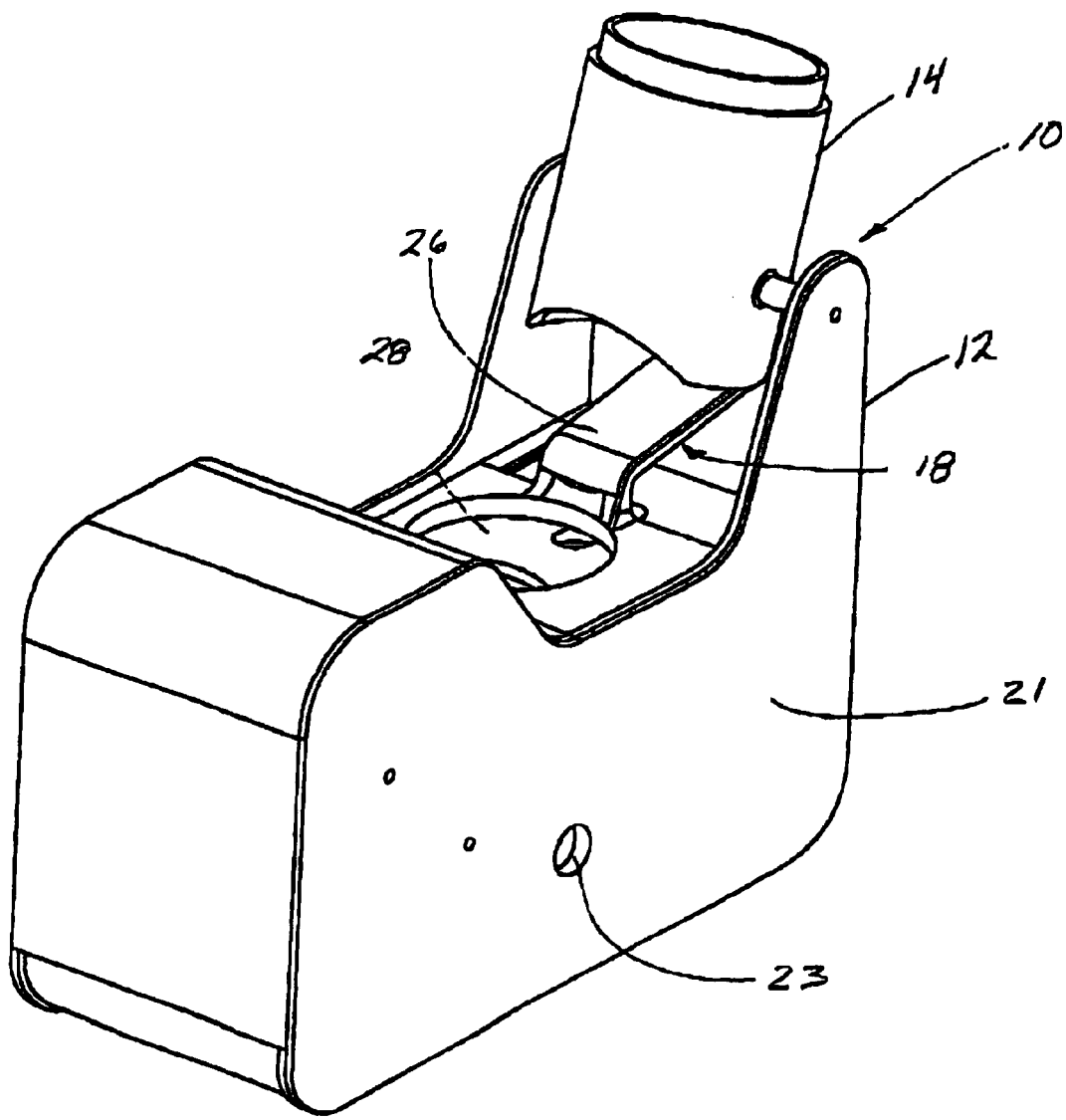
FIG. 1 is a perspective view of the table tennis ball delivery device of the present invention.
Figure 3:
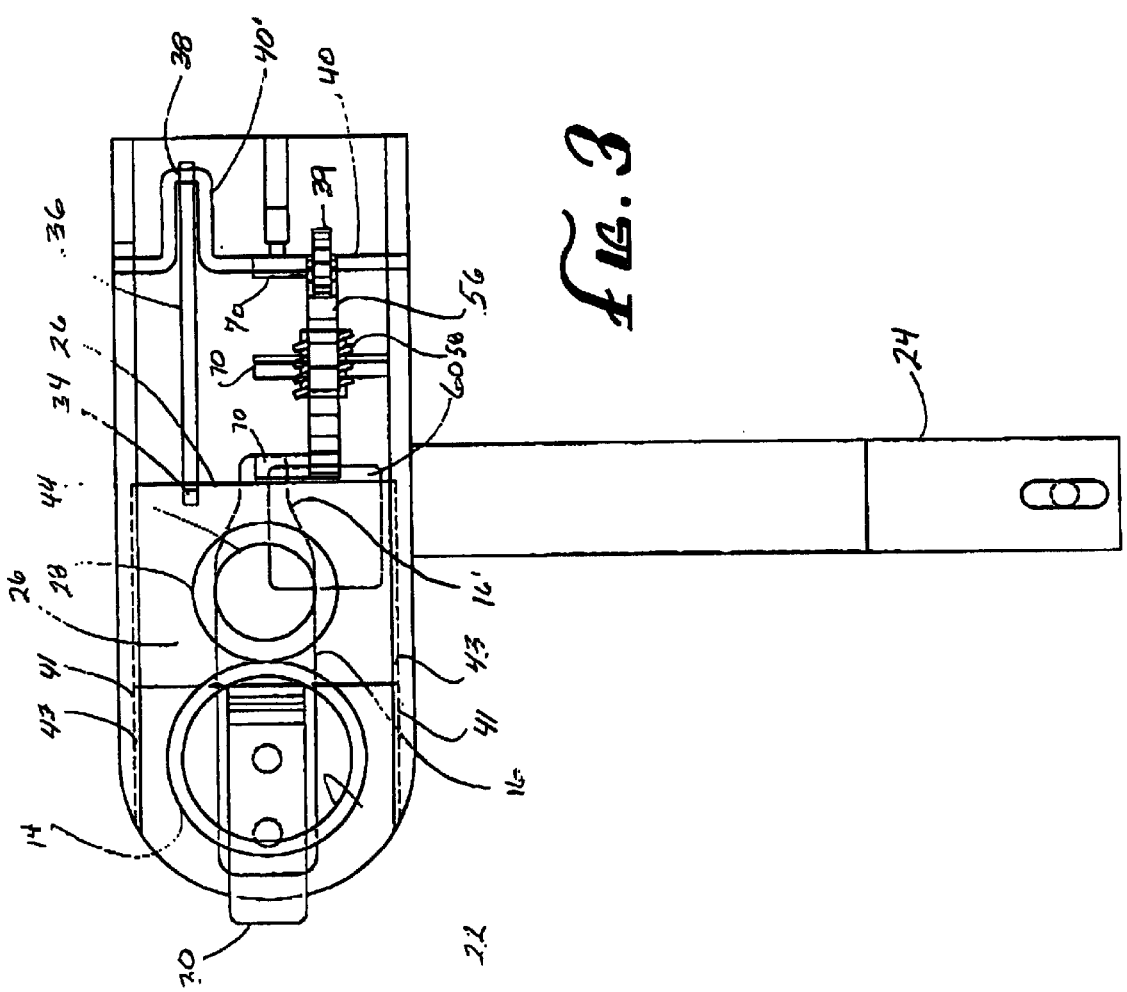
FIG. 3 is a diagrammatic top plan view of the table tennis ball delivery device of the present invention with the upper surface of the housing removed to illustrate the mechanisms therein.
Figure 4:
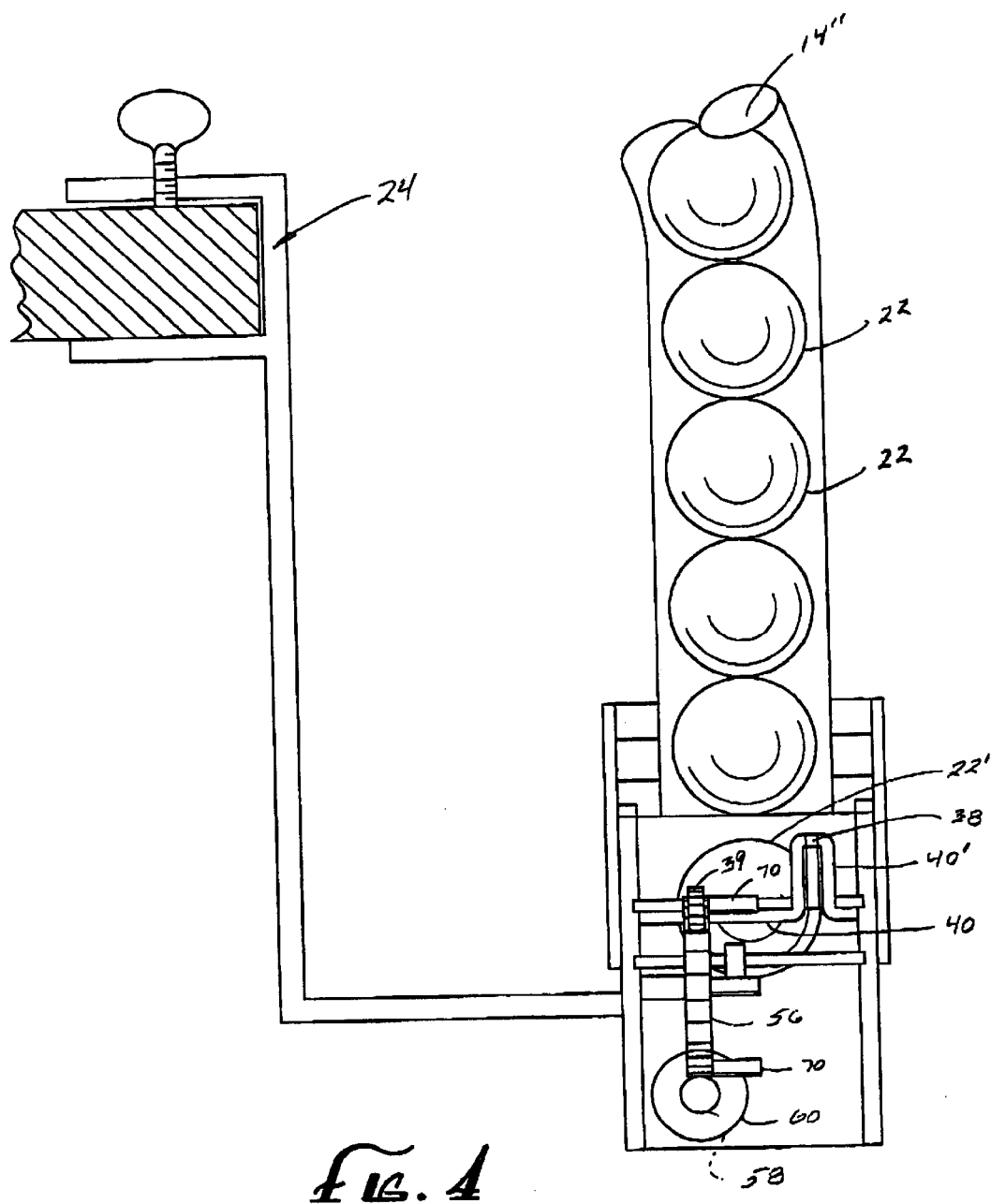
FIG. 4 is a diagrammatic front view of the table tennis ball delivery device of the present invention with the front wall of the housing removed to illustrate the mechanisms therein with the crank rotated slightly from the position of FIG. 2 so that it is visible in this view.
Figure 5:
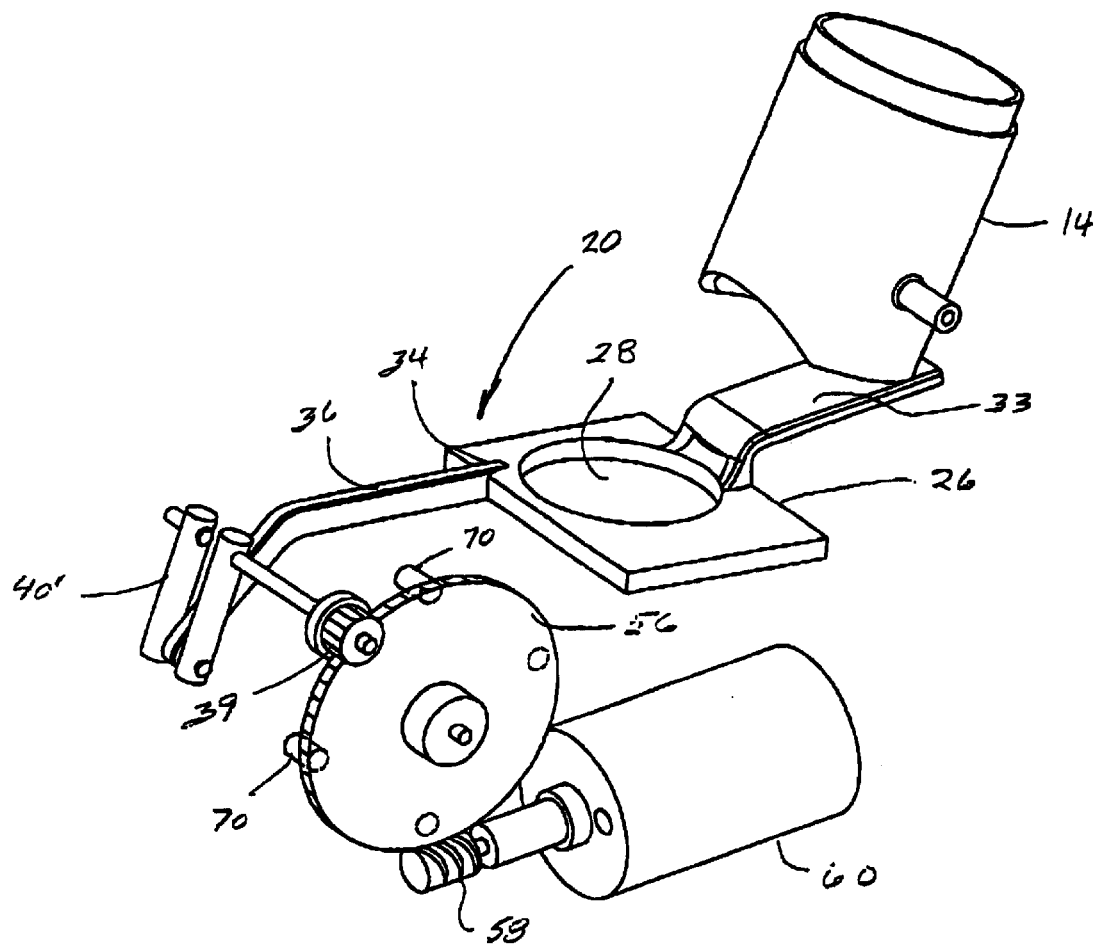
FIG. 5 is a perspective view of the ball positioning mechanism of the present invention.

Referring now in detail to the drawings, the table tennis ball delivery device 10 of the present invention comprises a housing 12, a ball chamber 14, a ball delivery spring 16, a ball transfer and positioning assembly 18 and a mechanism 20 for flexing and releasing the spring 16 to effect delivery of a ball to a player. Typically, two such devices are employed on each table, one being is preferably mounted on a side of the table proximate each end thereof for delivering balls to the player positioned at that end of the table. In FIG. 1, an aperture 21 is provided in the side wall 23 of housing 12 for securement of the device to the table or other mounting stand (not shown). FIGS. 3 and 4 illustrate a clamp 24, which can be of any desired configuration for securing the device to the side of the table. If desired, however, the device 10 could be freestanding and physically separated from the table.

In the embodiments of the invention illustrated in the drawings, the ball chamber 14 extends upwardly from the housing 12 so as to sequentially feed the lead ball 22' of a plurality of balls 22 to the ball transfer and positioning mechanism 20. The chamber 14 is preferably sized so as to be slightly larger than the diameter of a single ball and utilizes a gravity feed to direct balls from its upper end to the lower end 14' which is upwardly adjacent the ball delivery and positioning assembly 18. In the preferred configuration of chamber 14, the upper end of the chamber traces a helical path (indicated at 14") so as to enhance the ball carrying capacity of the chamber per unit of elevation. It is to be understood, however, that other configurations of ball reservoirs could be employed for carrying a large supply of table tennis balls and directing the lead ball to the ball transfer and positioning mechanism 20.

Figure 2:
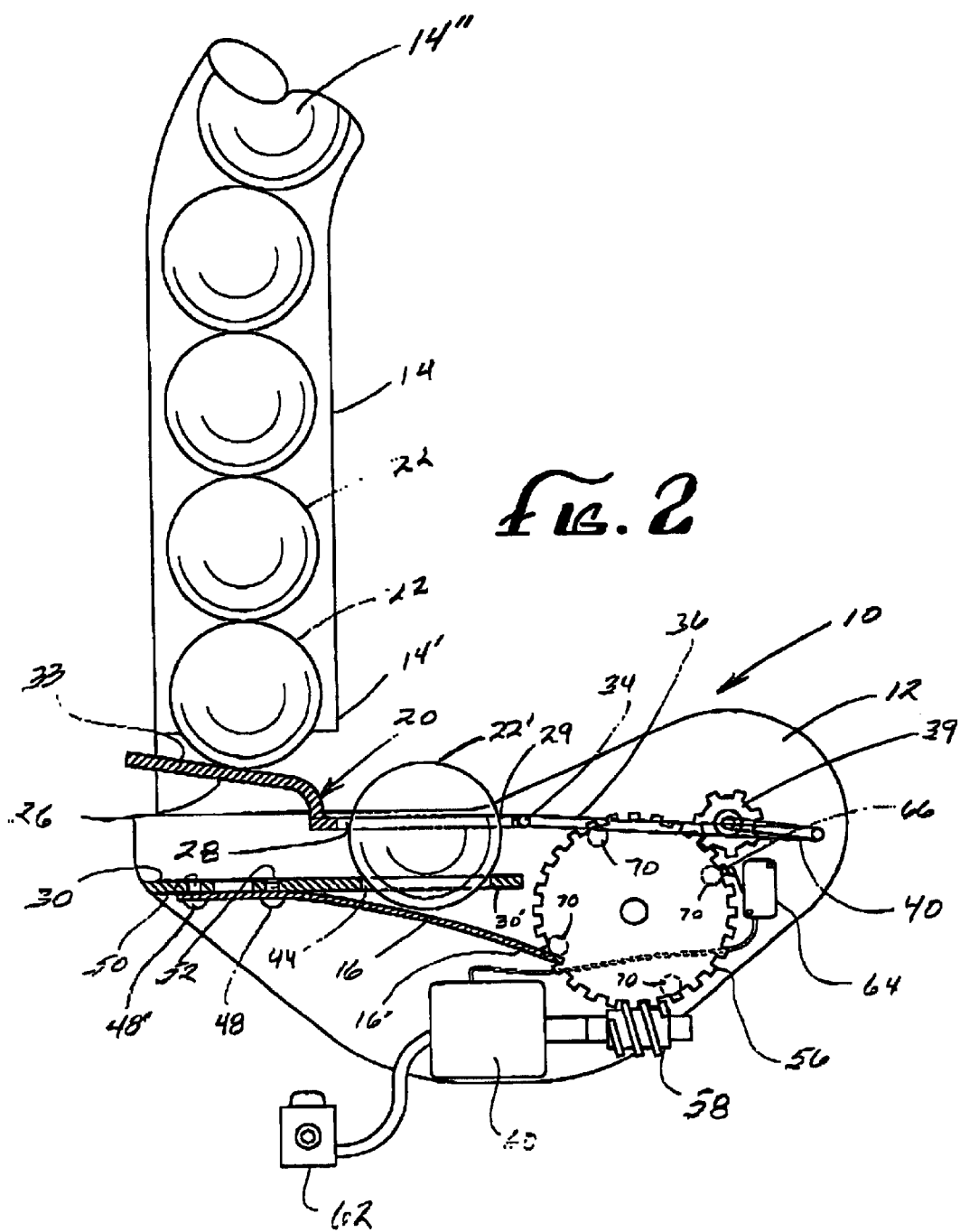
FIG. 2 is a diagrammatic side view of the table tennis ball delivery device of the present invention with the side wall of the housing removed to illustrate the mechanisms therein.

As the supply of table tennis balls 22 pass through chamber 14, the lead ball 22' drops from the lower end 14' of the chamber onto the transfer and positioning assembly 20. The assembly includes a ball transfer arm 26 that is horizontally positioned below ball chamber 14 and defines a circular opening 28 therein proximate an extended end 29 of the arm 26. Opening 28 is positioned directly below the open lower end 14' of chamber 14 and defines a diameter slightly greater than the diameter of a table tennis ball such that upon ball 22' being drawn by gravity from chamber 14 into the opening 28 in arm 26, the ball will extend partially through opening 28 and be supported by a horizontally positioned ball support arm 30 as seen in FIG. 2. The other end 32 of the ball transfer arm 26 defines a solid support surface 33 that prevents any additional balls from exiting chamber 14.

End 29 of arm 26 is rotatably linked at 34 to a first shuttle arm 36, which in turn is rotatably linked at 38 to a U-shaped portion 40' of a second shuttle arm 40 so as to define a crank-type connection as illustrated in FIG. 3. A shuttle gear 39 is mounted on a transverse position of arm 40 proximate the other end thereof such that rotation of shuttle gear 39 will effect reciprocal motion of the ball transfer arm 26 via shuttle arms 36 and 40 to transfer balls from chamber 14 to the ball launch position occupied by ball 22' in FIG. 2. The lateral edges 41 of arm 26 are preferably carried within tracks 43 formed in the opposed side walls of housing 12 to maintain the proper alignment of arm 26 within the housing.

The ball support arm 30 that is horizontally positioned below ball transfer arm 26 is fixed in housing 12 and also defines a circular opening 44 therein. Opening 44, however, defines a diameter somewhat smaller than a table tennis ball so as to capture a ball therein that has moved from chamber 14 to the ball launch position. Delivery spring 16, which is preferably formed of steel and is about 0.015 inches thick, is preferably affixed to the underside 30' of the ball support arm 30 by a threaded screw 48 at one of openings 50 or 52, depending on the spring force desired, as will be explained later herein. The extended end 16' of delivery spring 16 projects beyond the end of support arm 30 and the perimeter of a pinned gear 56 (see FIGS. 2 and 3). Pinned gear 56 is operatively connected to a worm gear 58 with a 30:1 reduction that is in turn driven by a 3000 rpm DC motor 60, preferably powered by a nine-volt battery (not shown) so as to rotate gear 56 at about 100 rpm @ 75 oz.-in. of torque. A pushbutton switch, schematically illustrated at 62, is provided for activating motor 60. Switch 62 is preferably conveniently located on the side of the table tennis table so that a player wishing a ball to be delivered can easily push the button or strike the button with his or her paddle to activate the electric motor 60.

Pinned gear 56 carries four 3/16-in. diameter metal dowels 70 spaced at 90-degree intervals that project inwardly from the gear 56 proximate the perimeter thereof as seen in FIGS. 2 and 3. The extended end 16' of delivery spring 16 extends beyond a dowel 70 located at the 9:00 o'clock position on gear 56 as seen in FIG. 2 such that rotation of the gear 56 in a counterclockwise direction as seen in FIG. 2 will cause a dowel passing that position to engage the extended end 16' of the delivery spring 16 and draw that end of the spring away from the underside 30' of the ball support arm 30. Continued counterclockwise rotation of gear 56 will cause that dowel to pass beyond the extended end 16' of the spring, releasing the spring and allowing the spring to snap against the underside 30' of the ball support arm 54 to launch ball 22' to the player. Continued rotation of the gear will cause the next dowel to again contact the extended end 16' of the delivery spring 16, withdraw that end from the underside of the ball support arm to the fully flexed or cocked position and then release the spring to again cause the spring to snap against the underside of the ball support arm and launch another ball.

To prevent continued launching of balls, a switch 64 is positioned proximate gear 56 for deactivating electric motor 60 upon a contact member 66 of the switch 64 abutting one of the dowels 70 carried by gear 56. The positioning of switch 64 is such that motor 60 will be deactivated in the position illustrated in FIG. 2 wherein the extended end 16' of spring 16 is at its maximum flexed position or cocked position. Rotation of the pinned gear 56 also causes a rotation of the shuttle gear 39 to which the ball transfer arm 26 is linked via shuttle arms 36 and 40 to effect a recycling of the ball transfer arm and a delivery of a new table tennis ball to the launch position illustrated in FIG. 2. Each cycle is thus effected by a 90-degree rotation of the pinned gear 56.

Modifications of the above-described mechanisms could be employed to provide the coordinated movement of the ball transfer and positioning mechanism 20 and spring 16. For example, inwardly projecting pins defining dowels 70 could extend between a pair of axially aligned gears of the same or different size with one of the gears being operatively connected to a worm gear similar to gear 58 that would be driven by the motor 60 and the other of the two gears being operatively connected to a gear such as shuttle gear 39 so as to increase the flexibility of varying gear ratios if so desired.

In use, when the player wants a ball 22 to be delivered by device 10, he or she depresses the pushbutton switch 62 activating motor 60 to effect rotation of the worm gear 58 and pinned gear 56. When the dowel 70 abutting the end 16' of delivery spring 16 clears the end of the spring, the spring will snap against the underside of the ball support arm 26 launching the table tennis ball 22 carried thereby to the player activating switch 62. Rotation of the gear 56 will then continue through 90 degrees to re-cock the delivery spring as above described.

Thus, the ball transfer and positioning assembly 18, comprising ball transfer arm 26, shuttle arms 36 and 40 and shuttle gear 39 is coordinated via the equidistantly spaced dowels 70 and the positioning of the motor deactivating switch 64 with the cocking and release of delivery spring 16 such that when the delivery spring is in the flexed or cocked position, the lead ball 22' is held in opening 44 in ball support arm 26 ready to be launched by the release of the spring 16 and upon the release of the spring and launch of the ball, the ball transfer arm 26 is translated to its extended position such that the opening 28 therein is directly under the lower end of the ball chamber 14 to receive the next ball in the chamber and then returns that ball to the launch position.

The force of the delivery spring 16 against the table tennis ball determines the distance the ball is launched by device 10 and can be varied depending on the player's desires. While changing the thickness of the spring 16 will, of course, vary the spring force, varying the location at which spring 16 is secured to the ball support bar and thus the effective length of the spring will also affect the spring force. To provide a variable spring force for the players, two mounting apertures 50 and 52 are provided in arm 30 for use with a threaded screw 48. By changing the aperture through which the screw extends to secure the spring to the ball support arm 30 and by varying the tightness of the screw, the effective spring length and thus the spring force can be adjusted to vary the launch of the ball in accordance with the desire of the players. In FIG. 2, screw 48 engages arm 30 through aperture 52 and is shown in the fully inserted position to shorten the effective length of the spring 16 and thereby increase the spring force. The screw is illustrated in phantom lines at 48' in aperture 50. Other means of adjusting the spring force could, of course, also be employed.

Figure 6:
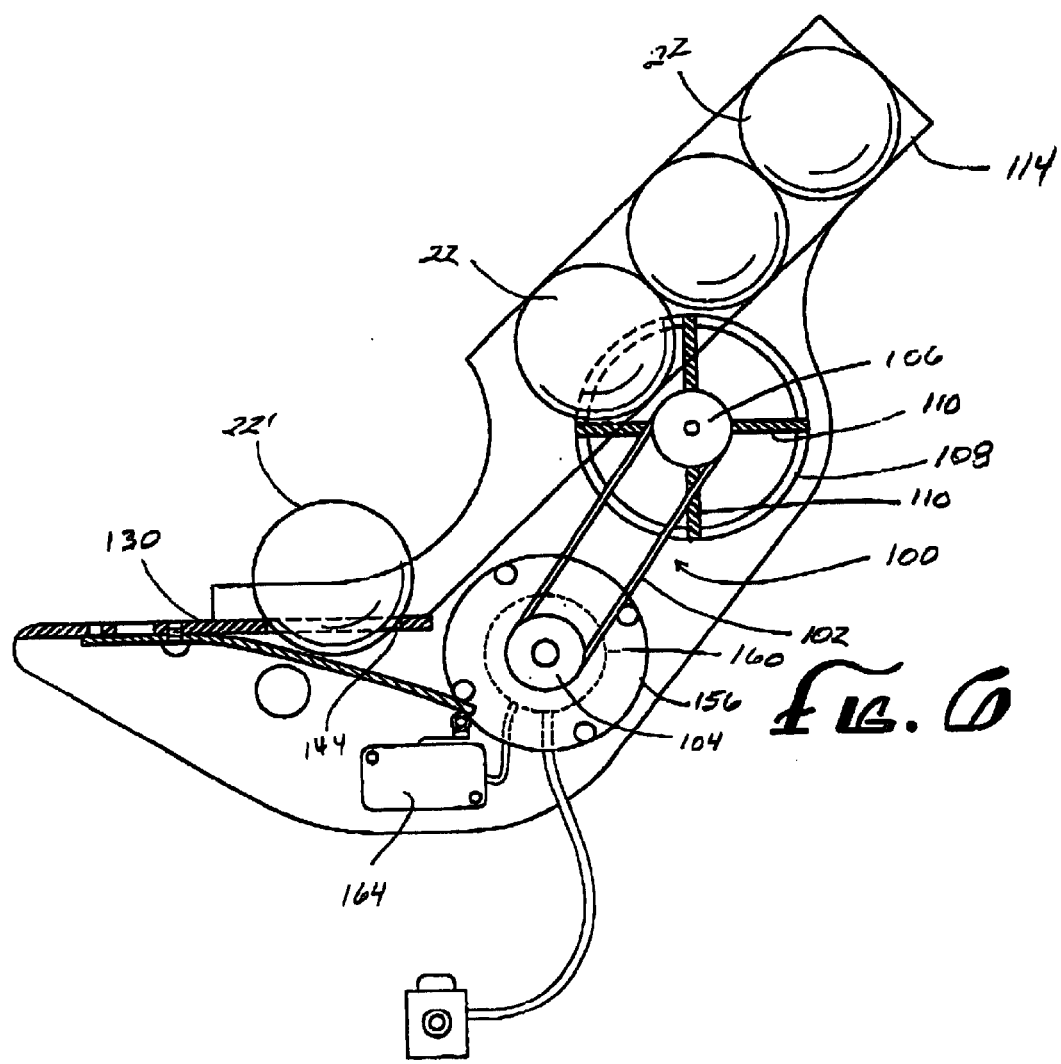
FIG. 6 is a diagrammatic side view of a preferred embodiment of the ball delivery device of the present invention with the side wall of the housing removed to illustrate the mechanisms therein.

An alternate and preferred embodiment of the invention is illustrated in FIG. 6 in which the ball transfer and positioning assembly of the prior embodiment is replaced with a belt-driven wheel assembly 100. Assembly 100 comprises a drive belt 102 extending between a first pulley 104 carried by pinned gear 156 and a second pulley 106 on paddle wheel 108. The remainder of the components of the preferred embodiment are essentially the same as in the prior embodiment, except that the location of the motor shutoff switch 164 and the orientation of chamber 114 have been modified somewhat to accommodate the new configuration of the ball transfer and positioning assembly. In the alternative embodiment, as the pinned gear 156 is rotated in a counterclockwise direction as seen in FIG. 6 by motor 160, the drive belt 102 effects a corresponding 90-degree rotation of the paddle wheel 108 and the next ball in line is released by the baffles 110 thereon to pass downwardly onto the ball support arm 130 where the ball is held in an aperture 144. Otherwise, the operation of the preferred embodiment of the invention is the same as in the prior embodiment. It is to be understood that a chain drive could be employed in lieu of the above-described belt drive and the two pulleys replaced with sprockets.

Various other changes and modifications may be made in carrying out the present invention without departing from the spirit and scope thereof. Insofar as those changes and modifications are within the purview of the appended claims, they are to be considered as part of the present invention.

What is claimed is:

1. A ball delivery device adapted to be mounted on or adjacent a tennis table for delivering table tennis balls to a player in response to the activation of a switch by the player, said device comprising:
   a chamber for carrying a supply of table tennis balls;
   a spring member;
   a ball transfer and positioning assembly for selectively advancing one of the balls from said chamber to a ball launch position proximate said spring member; and
   a plurality of spring engagement members moveable in response to the activation of said switch for periodically engaging, flexing and releasing said spring member such that the spring member strikes the ball in said launch position, driving said ball upwardly into the air toward said player.

2. The ball delivery device of claim 1 wherein said spring engagement members are moveable about a fixed axis.

3. The ball delivery device of claim 1 wherein said chamber comprises a vertical portion and a helical portion, said helical portion being disposed above said vertical position.

4. The ball delivery device of claim 1 wherein said spring member is a leaf spring.

5. The ball delivery device of claim 1 wherein said spring member is a leaf spring and said ball transfer and positioning assembly undergoes linear reciprocal movement in response to the activation of said switch to collect a ball from said chamber and deliver said ball to said ball launch position.

6. The ball delivery device of claim 1 wherein said ball transfer and positioning assembly comprises a rotating feeder having at least one member thereon for separating said one table tennis ball from the plurality of balls and advancing said one ball to said ball launch position.

7. The ball delivery device of claim 6 wherein the ball transfer and positioning assembly is operatively connected to said plurality of spring engagement members such that said transfer and positioning assembly advances a ball to said ball launch position as one of said spring engagement members engages and flexes said spring member.

8. The ball delivery device of claim 1 wherein said ball transfer and positioning assembly includes a planar element having an aperture therein sized to receive one of said balls therein, and a drive assembly effecting reciprocal movement of said planar element so as to selectively move said aperture between a ball collection position adjacent said chamber and said ball launch position, whereby upon said transfer and positioning assembly transferring a ball to said launch position, the ball is positioned so as to be struck by said spring member and driven toward the player.

9. The ball delivery device of claim 8 including a ball collection surface having an aperture therein sized to receive one of said balls therein such that a portion of the ball extends downwardly through said aperture therein, said surface positioning said ball proximate said spring member such that upon flexing and releasing said spring member in response to the activation of the switch, said spring member strikes the portion of said ball extending through said aperture, driving the ball toward the player.

10. The ball delivery device of claim 9 wherein said ball collection surface is disposed below said planar element.

11. The ball delivery device of claim 8 wherein said plurality of spring engagement members are carried by said drive assembly.

12. The ball delivery device of claim 11 wherein said spring member is a leaf spring.

13. A ball delivery device adapted to be mounted on or adjacent a tennis table for delivering table tennis balls to a player in response to the activation of a switch by the player, said device comprising:
   a chamber for carrying a supply of table tennis balls;
   a spring member;
   a ball transfer and positioning assembly for selectively advancing one of the balls from said chamber to a ball launch position proximate said spring member; and
   a ball collection surface having an aperture therein sized to receive one of said balls therein such that a portion of the ball extends downwardly through said aperture therein, said surface positioning said ball proximate said spring member such that upon flexing and releasing said spring member in response to the activation of the switch, said spring member strikes the portion of said ball extending through said aperture, driving the ball toward the player; and
   a plurality of spring engagement members moveable in response to the activation of the switch so as to engage, flex and release said spring member to strike said ball.

14. The ball delivery device of claim 13 where the spring member is a leaf spring.

15. The ball delivery device of claim 13 wherein the ball transfer and positioning assembly includes a rotatable member and wherein said spring engagement members are carried by and equiangularly spaced about said rotatable member.

16. The ball delivery device of claim 13 wherein the ball transfer and positioning assembly includes a rotating feeder operatively connected to said spring engagement members for delivering a ball in said chamber to said aperture in said ball collection surface as one of said spring engagement members abuts and flexes said spring member.

17. The ball delivery device of claim 15 wherein said rotatable member defines a toothed gear.

18. A ball delivery device adapted to be mounted on or adjacent a tennis table for delivering table tennis balls to a player in response to the activation of a switch by the player, said device comprising:
   a chamber for carrying a supply of table tennis balls;
   a spring member;
   a ball transfer and positioning assembly for selectively advancing one of the balls from said chamber to a ball launch position proximate said spring member, said ball transfer and positioning assembly includes a planar element having an aperture therein sized to receive one of said balls therein, and a drive assembly effecting reciprocal movement of said planar element so as to selectively move said aperture between a ball collection position adjacent said chamber and said ball launch position, whereby upon said transfer and positioning assembly transferring a ball to said launch position, the ball is positioned so as to be struck by said spring member and driven toward the player; and
   a ball collection surface having an aperture therein sized to receive one of said balls such that a portion of the ball extends downwardly through said aperture therein, said surface positioning said ball proximate said spring member such that upon flexing and releasing said spring member in response to the activation of the switch, said spring member strikes the portion of said ball extending through said aperture, driving the ball toward the player.

19. A ball delivery device adapted to be mounted on or adjacent a tennis table for delivering table tennis balls to a player in response to the activation of a switch by the player, said device comprising:

a chamber for carrying a supply of table tennis balls;

a striking member;

a ball transfer and positioning assembly for selectively advancing one of the balls from said chamber to a ball launch position proximate said striking member, said transfer and positioning assembly including a planar element having an aperture sized to receive one of said balls therein and a drive assembly effecting reciprocal movement of said planar element so as to selectively move said aperture between a ball collecting position adjacent said chamber and said ball launch position such that upon activation of said switch, said striking member strikes the portion of said ball extending through said aperture, driving the ball toward the player.

20. The ball delivery device of claim 19 wherein said striking member is a spring member and wherein said device further includes a plurality of spring engagement members moveable in response to the activation of the switch so as to engage, flex and release said spring member so as to strike said ball.

21. The ball delivery device of claim 20 including a rotatable member and wherein said spring engagement members are carried by and equiangularly spaced about said rotatable member.

22. The ball delivery device of claim 21 wherein said rotatable member defines a toothed gear.

23. A ball delivery device adapted to be mounted on or adjacent a tennis table for delivering table tennis balls to a player in response to the activation of a switch by the player, said device comprising:

a chamber for carrying a supply of table tennis balls;

a striking member;

a ball transfer and positioning assembly for selectively advancing one of the balls from said chamber to a ball launch position proximate said striking member, said assembly undergoing linear reciprocal movement in response to the activation of said switch to collect a ball from said chamber and deliver said ball to said ball launch position; and a ball collection surface having an aperture therein sized to receive one of said balls therein such that a portion of the ball extends downwardly through said aperture therein, said surface positioning said ball proximate said striking member such that upon activation of said switch, said striking member hits the portion of said ball extending through said aperture, driving the ball toward the player.

24. A ball delivery device adapted to be mounted on or adjacent a tennis table for delivery table tennis balls to a player in response to the activation of a switch by the player, said device comprising:

a chamber for carrying a supply of table tennis balls;

a striking member;

a ball transfer and positioning assembly for selectively advancing one of the balls from said chamber to a ball launch position proximate said striking member said assembly including a planar element for effecting the advancement of said balls and wherein said ball collection surface is disposed below said planar element; and a ball collection surface having an aperture therein sized to receive one of said balls therein such that a portion of the ball extends downwardly through said aperture therein, said surface positioning said ball proximate said striking member such that upon activation of said switch, said striking member hits the portion of said ball extending through said aperture, driving the ball toward the player.

25. The ball delivery device of claim 19 wherein the drive assembly includes a rotatable member operatively connected to said planar element for effecting flexing and release of said striking member and a drive motion operatively connected to said rotatable member for effecting rotation thereof.

26. The ball delivery device of claim 19 wherein said striking member comprises a leaf spring.

27. The ball delivery device of claim 19 wherein at least a portion of said striking member is flexible.

28. The ball delivery device of claim 19 wherein said switch defines a first switch and said drive assembly is operatively connected to said first switch for effecting said movememnt of said planar element in response to the activation of said first switch by the player and including a second switch for deactivating said drive assembly upon said aperture in said planar element being moved to said launch position whereupon subsequent activation of said first switch effects the striking of the ball by the striking member.

29. The ball delivery device of claim 19 wherein said striking member comprises a leaf spring and said drive assembly additionally effects the flexing of said leaf spring as said aperture in said planar element is moved to said launch position.

30. The ball delivery device of claim 25 wherein said striking member comprises a leaf spring.

31. The ball delivery device of claim 25 wherein at least a portion of said striking member is flexible.

32. The ball delivery device of claim 28 wherein said striking member comprises a leaf spring and said drive assembly additionally effects the flexing of said leaf spring as said aperture in said planar element is moved to said launch position.

33. The ball delivery device of claim 28 wherein said subsequent activation of said first switch additionally effects further reciprocal movement of said planar element to advance a second ball from said ball collection position to said launch position.

34. A ball delivery device adapted to be mounted on or adjacent a tennis table for delivery table tennis balls to a player in response to the activation of a first switch by the player, said device comprising:

a chamber for carrying a supply of table tennis balls;

a striking member;

a ball transfer and positioning assembly for selectively advancing one of the balls from said chamber to a ball launch position proximate said striking member, said transfer and positioning assembly including a planar element having an aperture therein for receiving one of said balls therein such that a portion of the ball extends downwardly through said aperture, and a drive assembly operatively connected to said planar element for effecting reciprocal movement of said planar element so as to selectively advance said ball to said launch position and effecting the flexing and release of said striking member in response to the activation of said first switch such that said striking member hits the portion of said ball extending through said aperture, driving the ball toward the player.

35. The ball delivery device of claim 34 wherein said striking member comprises a leaf spring.

36. The ball delivery device of claim 34 wherein said chamber comprises a vertical portion and a helical portion, said helical portion being disposed above said vertical portion.

37. The ball delivery device of claim 34 wherein said drive assembly is operatively connected to said first switch for effecting said movement of said planar element in response to the activation of said first switch by the player and including a second switch for deactivating said drive assembly upon said ball being moved to said launch position whereupon subsequent activation of said first switch effects the striking of the ball by the striking member.

38. The ball delivery device of claim 34 wherein said striking member comprises a leaf spring and said drive assembly additionally effects the flexing of said leaf member as said aperture in said planar element is moved to said launch position.

39. The ball delivery device of claim 38 including a support arm disposed below said planar element, said leaf spring being mounted on said support arm.

40. The ball delivery device of claim 37 wherein said subsequent activation of said first switch additionally effects further reciprocal movement of said planar element to advance a second ball from said ball collection position to said launch position.

41. The ball delivery device of claim 37 wherein said striking member comprises a leaf spring and said drive assembly additionally effects the flexing of said leaf member as said aperture in said planar element is moved to said launch position.

42. The ball delivery device of claim 37 wherein said striking member comprises a leaf spring.

43. The ball delivery device of claim 38 wherein said subsequent activation of said first switch additionally effects further reciprocal movement of said planar element to advance a second ball from said ball collection position to said launch position.

44. The ball delivery device of claim 39 wherein said support arm has an aperture therein sized such that upon said planar element advancing said ball to the launch position, said portion of the ball extending downwardly through said aperture in planar element will extend partially through said aperture in support arm so as to support said ball on arm such that said ball can be struck by said striking member.

* * * * *